(12) United States Patent
Prakash

(10) Patent No.: US 7,570,835 B2
(45) Date of Patent: Aug. 4, 2009

(54) EDGE SMOOTHING FILTER FOR CHARACTER RECOGNITION

(75) Inventor: Ravinder Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 10/780,485

(22) Filed: Feb. 17, 2004

(65) Prior Publication Data

US 2005/0180653 A1    Aug. 18, 2005

(51) Int. Cl.
*G06K 9/40* (2006.01)
(52) U.S. Cl. .................. 382/264; 382/167; 382/260; 382/266; 358/3.26; 358/3.27; 358/463
(58) Field of Classification Search ............ 382/167, 382/260, 264, 266, 308, 205, 269, 274, 275; 358/3.26, 3.27, 516, 463, 1.9
See application file for complete search history.

(56) References Cited

U.S. PATENT DOCUMENTS

| | | | |
|---|---|---|---|
| 4,450,483 A | | 5/1984 | Coviello |
| 4,590,606 A | | 5/1986 | Rohrer |
| 5,237,646 A | | 8/1993 | Bunce |
| 5,315,415 A | * | 5/1994 | Kawai et al. ............. 358/515 |
| 5,404,411 A | * | 4/1995 | Banton et al. ............ 382/254 |
| 5,504,592 A | * | 4/1996 | Usami et al. ............. 358/518 |
| 5,581,372 A | * | 12/1996 | Kerz ....................... 358/3.14 |
| 5,754,674 A | * | 5/1998 | Ott et al. ................. 382/112 |
| 5,754,751 A | | 5/1998 | Smith et al. |
| 6,005,978 A | * | 12/1999 | Garakani ................. 382/218 |
| 6,072,510 A | * | 6/2000 | Ogletree et al. ......... 347/131 |
| 6,181,437 B1 | * | 1/2001 | Sawada ................... 358/1.9 |
| 6,392,765 B1 | * | 5/2002 | Sakaida .................. 358/525 |
| 6,408,109 B1 | * | 6/2002 | Silver et al. ............. 382/300 |
| 6,449,060 B1 | * | 9/2002 | Kawai et al. ............ 358/1.9 |
| 6,611,598 B1 | * | 8/2003 | Hayosh ................... 380/54 |
| 6,707,932 B1 | * | 3/2004 | Chakraborty ............ 382/113 |
| 6,965,695 B2 | | 11/2005 | Yamakawa |
| 6,983,886 B2 | * | 1/2006 | Natsukari et al. ....... 235/462.1 |
| 7,119,924 B2 | * | 10/2006 | Prabhakar et al. ....... 358/1.9 |
| 7,162,089 B2 | * | 1/2007 | Jin et al. ................. 382/199 |

FOREIGN PATENT DOCUMENTS

| | | |
|---|---|---|
| EP | 085 4636 A2 | 7/1998 |
| JP | 832 1944 A | 12/1996 |
| JP | 2003 101 737 A | 4/2003 |

OTHER PUBLICATIONS

Prakash, U.S. Appl. No. 11/850,927, CHA920030036US2, Office Action Communication, Jul. 10, 2008, 10 pages.
Prakash, U.S. Appl. No. 11/850,927, CHA920030036US2, Office Action Communication, Dec. 15, 2008, 10 pages.

* cited by examiner

*Primary Examiner*—Yosef Kassa
(74) *Attorney, Agent, or Firm*—Douglas A. Lashmit; Hoffman Warnick LLC

(57) ABSTRACT

A system and method for correcting defects in a black white image. An edge smoothing filter is disclosed that comprises: a system for selecting a block of pixels comprising one center pixel and eight exterior pixels; and an algorithm that examines the block of pixels, wherein the algorithm overwrites the value of the center pixel if: all three pixels along a first edge share a first value; and all three pixels along an opposing edge share a second value that is opposite of the first value; and the two exterior pixels residing between the first and second edge share a common value.

6 Claims, 3 Drawing Sheets

EDGE SMOOTHING FILTER FOR CHARACTER RECOGNITION

BACKGROUND OF THE INVENTION

1. Technical Field

The present invention relates generally to character recognition systems, and more specifically relates to an edge smoothing filter for correcting defects in black white image details.

2. Related Art

The ability to read and interpret character information remains an important challenge for enterprises, such as banks, that must process printed documents. In a typical application, documents such as bank checks are scanned and then character information, such as account numbers, etc., is extracted and stored. Often, during the scanning process, defects are introduced that lead to errors in the character recognition process.

One cause for such defects results from the bitonal conversion algorithms used to generate black white images. In most scanners, black white images are generated from gray scale images. A bitonal conversion algorithm is used to convert the gray scale image to a black white image, which is then read by a character recognition system, such as OCR (Optical Character Recognition), MICR (Magnetic Ink Character Recognition), thermal imaging, etc.

FIG. 1 depicts a black white image with character data (i.e., string "6 6") containing two types of defects that are commonly introduced. As can be seen, various edges of the characters have protrusions 12 (i.e., black pixels protruding out) and/or indentations 14 (i.e., black pixels missing). More often than not, several such defects are present in character data found in black white images. These types of defects can create problems for character recognition, image scaling, etc. Accordingly, a need exists for a system and method for eliminating character defects in black white images.

SUMMARY OF THE INVENTION

The present invention addresses the above-mentioned problems, as well as others, by providing an edge smoothing filter for correcting defects in character data of a black white image. In a first aspect, the invention provides an edge smoothing filter for correcting defects in a black white image, comprising: a system for processing blocks of pixels in the black white image, wherein each block comprises one center pixel and eight exterior pixels; and an algorithm that examines each block of pixels, wherein the algorithm overwrites the value of the center pixel if: all three pixels along a first edge share a first value; and all three pixels along an opposing edge share a second value that is opposite of the first value; and the two exterior pixels residing between the first and second edge share a common value.

In a second aspect, the invention provides a method for correcting defects in a black white image, comprising: selecting a block of pixels from the black white image, wherein the block comprises one center pixel and eight exterior pixels; examining the block of pixels to determine if: all three pixels along a first edge share a first value, and all three pixels along an opposing edge share a second value that is opposite of the first value, and two exterior pixels residing between the first and second edge share a common value; and if the above conditions are met, overwriting the value of the center pixel with the common value of the two exterior pixels.

In a third aspect, the invention provides a program product stored on a recordable medium for correcting defects in a black white image, comprising: means for selecting a block of pixels, wherein the block comprises one center pixel and eight exterior pixels; and means for examining the block of pixels to determine if: all three pixels along a first edge share a first value, and all three pixels along an opposing edge share a second value that is opposite of the first value, and two exterior pixels residing between the first and second edge share a common value; and means for overwriting the center pixel with the common value of the two exterior pixels if all conditions of the examining means are met.

In a fourth aspect, the invention provides a character recognition system that processes character data from a black white image, comprising: an edge smoothing filter that examines blocks of pixels in the black white image to determine if an indent or protrusion defect exists, and if so corrects the defect in a filtered image; and a recognition engine examines the filtered image and extracts character information.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 2:
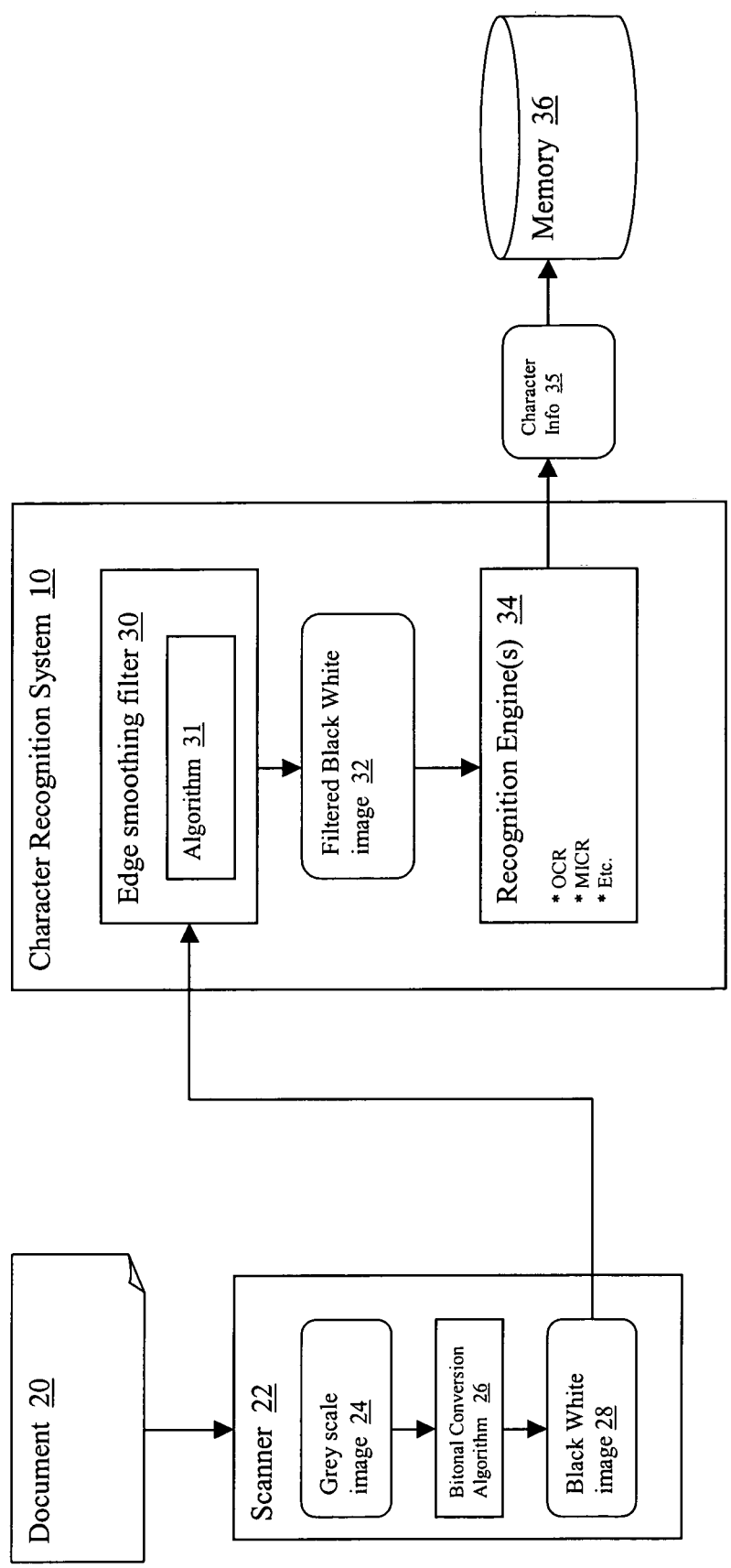
FIG. 2 depicts a character recognition system having an edge smoothing filter in accordance with the present invention.

Referring now to FIG. 2, an exemplary implementation of the edge smoothing filter 30 of the present invention is described embodied in a character recognition system 10. In this embodiment, a character recognition system 10 is provided that receives a black white image 28 containing printed characters or character data. Before being processed by a recognition engine 34, the black white image 28 is first passed through the edge smoothing filter 30 to generate filtered black white image 32. The filtered black white image 32 is then processed by one or more recognition engines 34 to collect character information 35, which can then be further processed, stored in memory 36, etc.

In this exemplary embodiment, a document 20 is scanned by a scanner 22, which first generates a gray scale image 24. The gray scale image 24 is then processed using a bitonal conversion algorithm 26 to generate black white image 28. It is recognized that systems for generating black white images in this manner are known in the art, and therefore such systems are not discussed in further detail. It should also be understood that black white image 28 can originate from sources other than scanner 22, e.g., it could be retrieved from memory, etc.

As noted above, character data in black white image 28 often contains protrusion and indentation defects that can lead to errors by the recognition engine 34. Edge smoothing filter 30 seeks to correct these types of defects by examining blocks of pixels in the black white image 28, and if necessary, it overwrites pixel values in accordance with a set of rules embodied in algorithm 31. Edge smoothing filter 30 works by examining blocks of nine pixels arranged as follows, wherein each pixel has a value of either black or white:

|    |    |    |
|----|----|----|
| p1 | p2 | p3 |
| p4 | p5 | p6 |
| p7 | p8 | p9 |

Figure 1:
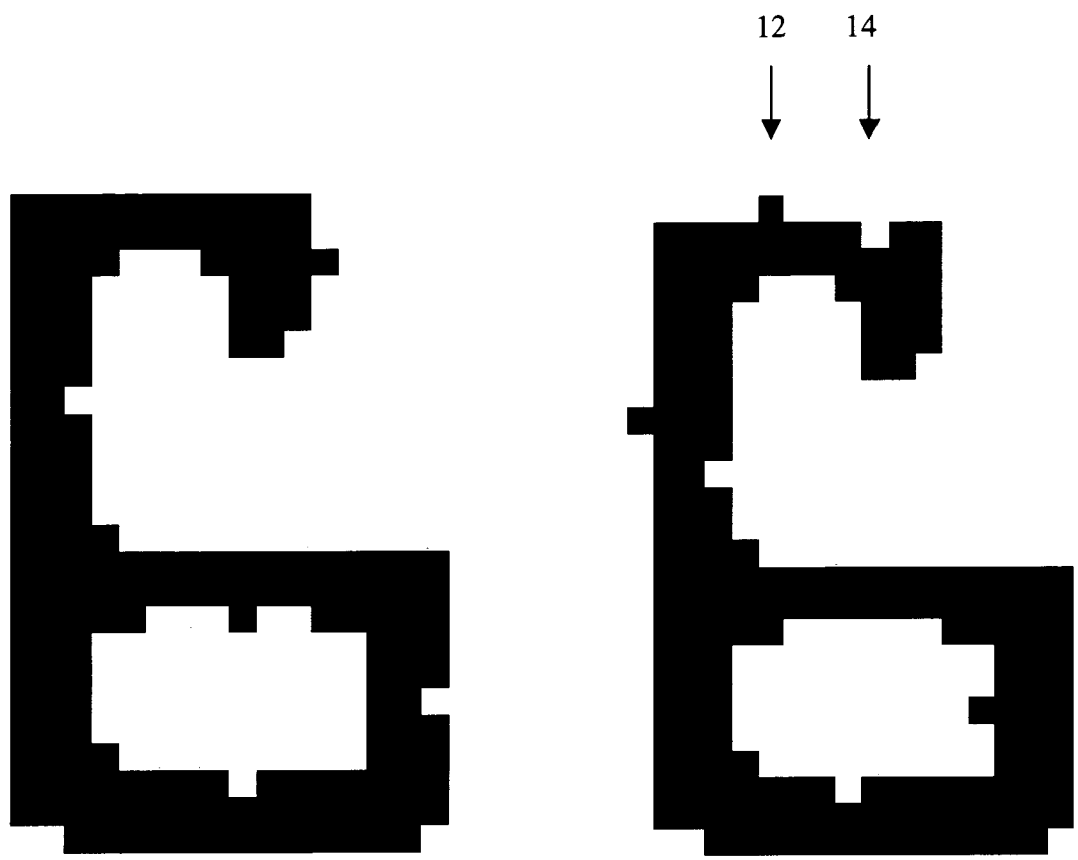
FIG. 1 depicts black white character data having defects.
Figure 3:
FIG. 3 depicts the black white character data of FIG. 1 after it has been passed through the edge smoothing filter of FIG. 2.

Depending on the values of the exterior pixels (p1-p4 and p6-p9) the algorithm 31 may automatically overwrite a value of the center pixel p5. Filter 30 sweeps through the entire black white image 28 in a rasterized manner such all of the pixels in the image, except for those pixels along the outer edges of the image, are selected as the center pixel p5 in the block of pixels. Note that any method may be used for sweeping through the black white image 28, e.g., a horizontal sweep, a vertical sweep, etc. FIG. 3 depicts the character data from FIG. 1 after being processed by edge smoothing filter 30. As can be seen, indentation and protrusion defects have been eliminated.

Each time a new block is selected by filter 30 during the sweep, algorithm 31 is applied to determine whether the center pixel p5 should be overwritten. Algorithm 31 can be summarized as follows: Select a block of nine pixels having one center pixel and eight exterior pixels, and perform the following test:

If (all three pixels along a first edge share a first value) and (all three pixels along an opposing edge share a second value that is opposite of the first value) and (the two exterior pixels between the first and second edge share a common value), then rewrite the center pixel to the common value of the two exterior pixels.

A four-step procedure for implementing algorithm 31 is explained below with reference to Tables 1 and 2. Table 1 depicts a 3×3 cell, with the center pixel P being the pixel of interest. Each entry in the 3×3 cell is a pixel location.

TABLE 1

|   |   |   |
|---|---|---|
| L | T | R |
| L | P | R |
| L | B | R |

Depending on the characteristics of the eight neighboring pixels, the pixel P may be overwritten with a black or white pixel.

Step 1. Are the three left cells (L) of the same value (i.e., either all white or all black) and are all three right cells (R) of the same value, but opposite to the left cells (e.g., all L's are black and all R's are white)? If yes, go to step 2, else go to step 3.

Step 2. Are both exterior pixels between the left and right edges (i.e., the top pixel T and the bottom pixel B) of the same value? If yes, overwrite P with that value and exit. If no, go to step 3.

Step 3. Reconfigure the 3×3 cell to that of Table 2.

TABLE 2

|   |   |   |
|---|---|---|
| T | T | T |
| L | P | R |
| B | B | B |

Are the top three cells T of the same value and are the bottom three cells B of the same value but opposite the three top cells T? If yes, go to step 4, else exit.

Step 4. Are both exterior pixels between the top and bottom edges (i.e., left pixel L and the right pixel R) of the same value? If yes, overwrite P with that value, else exit.

Consider the following defective pixel layout examples where B is a black pixel and W is a white pixel.

EXAMPLE 1

Consider the pixel layout that includes a protrusion:

|   |   |   |
|---|---|---|
| B | W | W |
| B | B | W |
| B | W | W |

Using the four-step process described above, the answer to step 1 would be yes since the left three pixels are of the same value (i.e., black) and the right three pixels are of the same value (i.e., white) but opposite the left three. The answer to step 2 would also be yes since the top and bottom (middle) pixels are both white. Thus, the middle pixel would be overwritten with a value white, as follows:

|   |   |   |
|---|---|---|
| B | W | W |
| B | W | W |
| B | W | W |

As can be seen, the protrusion in the original pixel layout has been smoothed out.

EXAMPLE 2

Consider the following pixel layout having an indentation:

|   |   |   |
|---|---|---|
| B | B | B |
| B | W | B |
| W | W | W |

In this case, the answer to step 1 would be no, which would send the algorithm to step 3. The answer to step 3 would be yes since the top three pixels are of the same value (i.e., black) and the bottom three pixels are of the same value (i.e., white) but opposite the top three. The answer to step 4 would also be yes since the left and right (middle) pixels are both black. Thus, the middle pixel would be overwritten with a value black, as follows:

|   |   |   |
|---|---|---|
| B | B | B |
| B | B | B |
| W | W | W |

As can be seen, the indentation in the original pixel layout has been smoothed out.

It should be understood that black white image 28 may comprise a limited portion of a larger image, e.g., it may comprise the part of a bank check that just includes text data such as the account number, etc. Furthermore, it is understood that edge smoothing filter 30 need not be integrated with character recognition system 10, i.e., it could be implemented as a separate standalone system, be integrated into scanner 22, be utilized with a scaling system, etc.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. An edge smoothing filter for correcting defects in a black white image of a bank check, comprising:
    a system for processing blocks of pixels from an account number on the bank check in the black white image, wherein each block comprises one center pixel and eight exterior pixels; and
    an algorithm that examines each block of pixels, wherein the algorithm overwrites the value of the center pixel if:
        all three pixels along a first edge share a first value; and
        all three pixels along an opposing edge share a second value that is opposite of the first value; and
        the two exterior pixels residing between the first and second edge share a common value.

2. The edge smoothing filter of claim 1, wherein the center pixel is overwritten with the common value of the two exterior pixels residing between the first and second edge.

3. The edge smoothing filter of claim 1, wherein the black white image comprises character data.

4. A method for correcting defects in a black white image, comprising:
    providing a black white image of a bank check;
    selecting a block of pixels from the black white image containing an account number on the bank check, wherein the block comprises one center pixel and eight exterior pixels;
    examining the block of pixels to determine if:
        all three pixels along a first edge share a first value, and
        all three pixels along an opposing edge share a second value that is opposite of the first value, and
        two exterior pixels residing between the first and second edge share a common value; and
    if the above conditions are met, overwriting the value of the center pixel with the common value of the two exterior pixels between the first and second edge.

5. The method of claim 4, wherein the steps are repeated for different blocks of pixels in the black white image.

6. A program stored in a computer readable medium for correcting defects in a black white image of a bank check, comprising:
    means for selecting a block of pixels from an account number on the bank check, wherein the block comprises one center pixel and eight exterior pixels; and
    means for examining the block of pixels to determine if:
        all three pixels along a first edge share a first value, and
        all three pixels along an opposing edge share a second value that is opposite of the first value, and
        two exterior pixels residing between the first and second edge share a common value; and
    means for overwriting the center pixel with the common value of the two exterior pixels if all conditions of the examining means are met.

* * * * *